United States Patent [19]

Marchal et al.

[11] 4,209,079
[45] Jun. 24, 1980

[54] LUBRICATING SYSTEM FOR BEARING SHOES

[75] Inventors: Gerard Marchal, Hellemes; Gilles Dumez, Lille; Bernard Deschamps, Villeneuve d'Ascq, all of France

[73] Assignee: Fives-Cail Babcock, Paris, France

[21] Appl. No.: 890,210

[22] Filed: Mar. 27, 1978

[30] Foreign Application Priority Data

Mar. 30, 1977 [FR] France ................................ 77 09447

[51] Int. Cl.² ........................ F01M 9/00; F16N 17/00
[52] U.S. Cl. .................................... 184/6.1; 241/176
[58] Field of Search ......................... 184/6.1, 6.3, 6.4; 241/176, 285; 308/73

[56] References Cited

U.S. PATENT DOCUMENTS

| | | | |
|---|---|---|---|
| 3,374,863 | 3/1968 | Kozlowski et al. | 184/6.3 |
| 3,720,288 | 3/1973 | Tschabold | 184/6.4 |
| 3,837,430 | 9/1974 | Decker et al. | 184/6.1 X |
| 3,976,165 | 8/1976 | Pilarczyk | 184/6.1 X |
| 4,108,410 | 8/1978 | Chielens et al. | 308/73 X |

Primary Examiner—David H. Brown
Attorney, Agent, or Firm—Kurt Kelman

[57] ABSTRACT

A lubricating system for bearing shoes supporting a drum of a crusher for rotation and defining a lubricating oil basin between an upstream and downstream end, in the direction of rotation, comprises a low pressure oil pump operable to deliver lubricating oil to the upstream end of the bearing shoes during rotation of the drum, a high pressure pump operable to deliver lubricating oil to the basin at the start of rotation, and thermocouples arranged to measure the temperature of the bearing shoes close to their gliding surfaces, the thermocouples controlling the high pressure pump operation in response to a temperature sensed by the thermocouples and exceeding a set value.

10 Claims, 1 Drawing Figure

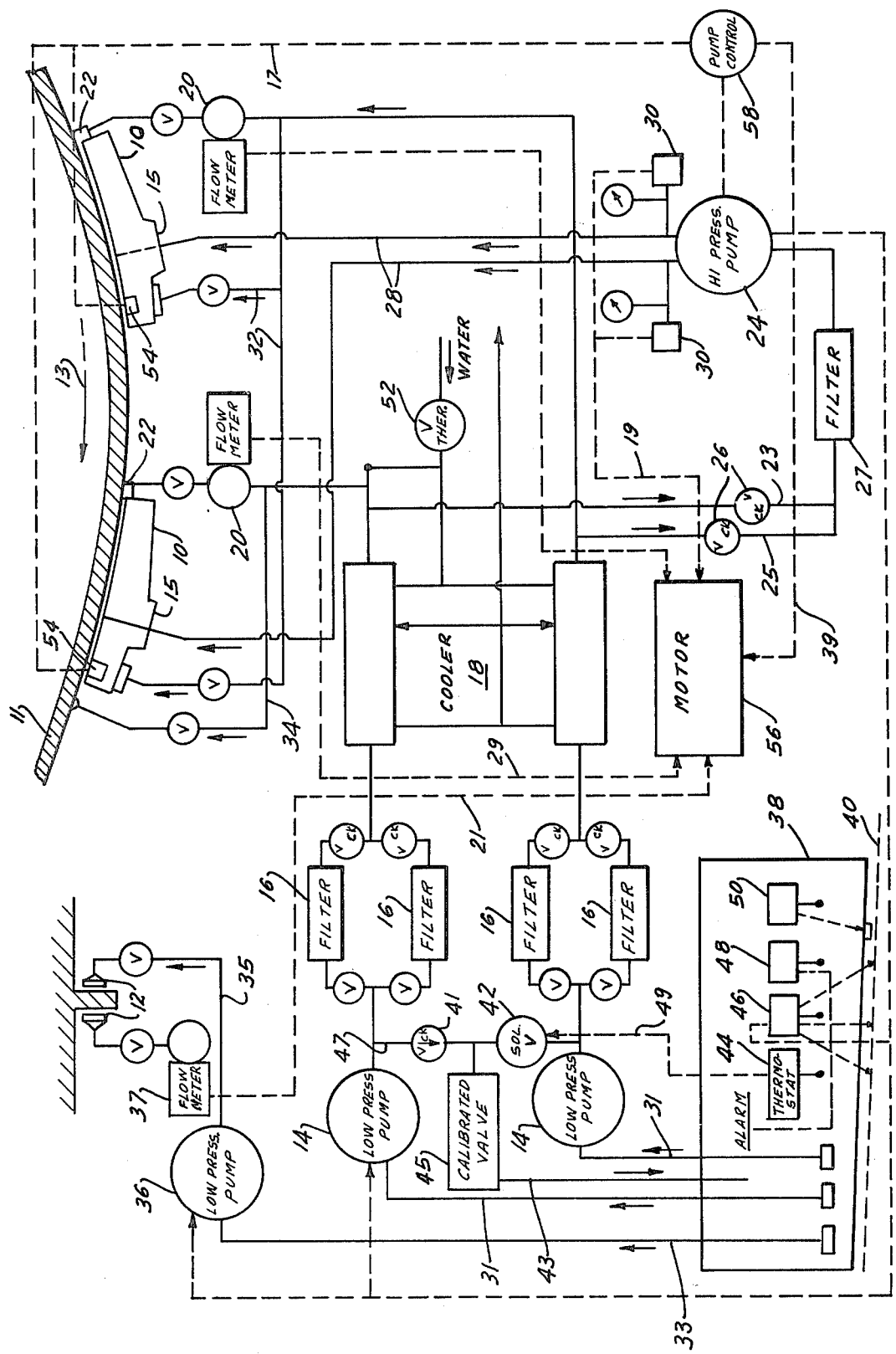

LUBRICATING SYSTEM FOR BEARING SHOES

The present invention relates to improvements in a lubricating system for bearing shoes having gliding surfaces supporting a heavy element of large diameter, such as a drum of a crusher, for rotation about an axis thereof in one direction, the bearing shoes having an upstream end and a downstream end, in this direction, and defining a lubricating oil basin therebetween.

Bearing supports for grinding mills have been disclosed in U.S. Pat. No. 4,108,410, dated Aug. 22, 1978, whose entire disclosure as far as pertinent to the present invention is incorporated by reference, the lubricating system being particularly useful with such bearing supports.

Know lubricating systems of this type comprise at least one low pressure lubricating oil pump operable to deliver lubricating oil to the upstream end of the bearing shoes during the rotation of the heavy element to form a lubricating oil film between the gliding surfaces of the bearing shoes and the surface of the rotating heavy element, and a high pressure lubricating oil pump operable to deliver lubricating oil to the basin at the start of the rotation.

To avoid undue wear of the bearing shoes and the gliding rings of the drums in contact with the bearing shoes, it is indispensible to assure permanent lubrication of their interface during rotation and stoppage of the rotation as soon as the lubricating system malfunctions.

In known lubricating systems, the oil flow delivered to the bearing shoes was measured and rotation of the crusher drum was stopped as soon as this flow fell below a set value. This solution was imperfect because it took into account only one possible reason for the malfunction of the system, i.e. the defective operation of the oil pumps or the oil delivery circuits. However, other reasons may cause a reduction in the lubricating efficiency, such as poor gliding surface conditions, and it is the primary object of this invention to provide a lubricating system wherein insufficient lubrication is detected whatever its cause and either to rectify the condition or to stop the rotation of the heavy element. In accordance with the invention, this detection is based on a temperature measurement at the gliding surfaces.

Accordingly, the present invention provides thermocouple means arranged to measure the temperature of the bearing shoes close to their gliding surfaces, the thermcouple means controlling the operating means for the high pressure pump for actuating this pump in response to a temperature sensed by the thermocouple means exceeding a first set temperature value.

According to a preferred feature of this invention, the thermocouple means are arranged close to the downstream ends of the bearing shoes. Depending on the dimension of the bearing shoes, the thermocouple means comprises one or more thermocouples per bearing shoe.

If the temperature sensed by the thermocouple means continues to increase beyond the first set temperature value, which triggers the actuation of the high pressure oil pump, the thermocouple means is arranged according to a preferred embodiment of the invention to control the actuating means for the rotation of the heavy element to stop the rotation in response to a temperature sensed by the thermocouple means exceeding a second set value higher than the first set temperature value, the operating means for the high pressure oil pump continuing to actuate this pump until rotation of the heavy element has completely ceased.

While a lubricating system of the above described type will avoid all accidents resulting from poor lubrication, good lubrication will be assured by temperature control means for maintaining the lubricating oil delivered to the bearing shoes within predetermined temperature limits.

The above and other objects, advantages and features of the present invention will become more apparent from the following detailed description of a now preferred embodiment thereof, taken in conjunction with the single FIGURE of the accompanying drawing schematically illustrating a circuit diagram of a lubricating system for a bearing and a bearing abutment of a crusher drum.

In a generally conventional manner, the crusher comprises drum 11 of large diameter and supported by two gliding rings on the gliding surfaces of two symmetrically arranged bearing shoes 10, 10 for rotation about a horizontal axis of the drum in the direction of arrow 13. An abutment comprises two bearings or two series of bearings 12 which absorb the forces parallel to the axis of the crusher drum.

In the drawing, the fluid conduits are shown in full lines while the electrical control lines are shown in broken lines.

In the illustrated embodiment, a low pressure circuit is associated with each bearing shoe 10, each low pressure circuit comprising a low pressure lubricating oil pump 14, two filters 16 interconnected to enable them to operate alternatingly, a water-cooled heat exchanger 18, and a flowmeter 20 leading to channel 22 at the upstream end of each bearing shoe, as determined by the direction of rotation indicated by arrow 13. Channels 22 extend over the entire width of the bearing shoes to assure the hydrodynamic lubrication of the bearing shoes during the rotation of crusher drum 11.

The illustrated lubricatring system also comprises high pressure lubricaring oil pump 24 whose output is connected by conduits 28 to lubricating oil basins 15 in the bottom of the bearing shoes between the upstream and downstream ends thereof while its input is connected by conduits 23 and 25 to the two low pressure circuits. A filter 27 is mounted between the input and conduits 23 and 25, and each of these conduits has a check valve 26 permitting flow of oil only in the direction of the high pressure pump input and preventing outflow from this pump back to the low pressure circuits. Pressure gauges 30 are mounted in conduits 28.

Cooling of the bearing shoes is assured by the circulation of oil delivered thereto from the low pressure circuits through conduits 32. Channels are provided for this purpose in the bearing shoe. Cooling of the gliding rings on the drum is effected by sprinkling lubricating oil thereon from branch conduits 34 leading to suitably arranged nozzles from the low pressure circuits.

Lubrication of the abutment bearings 12 is assured by another low pressure lubricating oil pump 36 having an output connected to conduit 35 delivering oil to bearings 12. Flowmeter 37 is disposed in delivery conduit 35.

Oil tank 38 holds a supply of lubricating oil and respective supply conduits 31 deliver oil from the tank to the input of low pressure pumps 14 and supply conduit 33 delivers oil from the tank to the input of low pressure pump 36. The tank has a bottom walls on which are mounted heating plates 40 enabling the oil in the tank to be heated. The oil tank is arranged to receive the oil dropping from the bearings.

One of the pumps 14 may be discharged by means of a solenoid valve 42 in return conduit 43. Check valve 41 permits only unidirectional flow through this conduit and calibrated valve 45 permits maintaining reduced pressure at the output of this pump when valve 42 is open (when the drum is stopped).

Thermostats 44, 48 and 50 control heating plates 40 to control the heating of the oil, the thermostats being arranged to measure the temperature close to the plates and to stop heating when the temperature exceeds a value exceeding that leading to calcination of the oil.

Thermostatically-controlled valve 52 controls the flow of cooling fluid, such as water, to heat exchanger 18 disposed in the low pressure delivery circuit of oil to the bearing shoes. Thus, the oil temperature is thermostatically controlled as the oil flows to the input of low pressure pumps 14 and 36, and the temperature of the oil delivered by pumps 14 to the bearing shoes is further thermostatically controlled in heat exchanger 18, a thermostat opening the water supply conduit to the heat exchanger when the oil temperature exceeds a set temperature value and closing the conduit when it falls below this value. The thermostats in the oil tank heat the oil therein when its temperature falls below a set temperature value and stops heating when this value is exceeded. At the same time, the thermostatic control of the temperature of the oil in tank 38 also stops the rotation of drum 11 when the temperature of the oil in the tank falls below a set value.

Bearing shoes 10 are equipped in accordance with the present invention with thermocouples 54 arranged to measure the temperature of the bearing shoes close to their gliding surfaces. The thermocouples control the operating means for actuating the high pressure pump 24 in response to a temperature sensed by the thermocouples exceeding a first set value, for which purpose electrical control circuit 17 connects thermocouples 54 to operating means 58 for high pressure pump 24, this operating means including a motor for driving the pump and a control for actuating the motor in response to the sensed temperature.

After a prolonged period of idleness of the crusher drum, the lubricating system must first be actuated to bring all operating elements, including the bearing shoes, to a desired temperature level, which is done by actuating the operation of pumps 14, 24 and 36. First, the low pressure pumps, or at least one of them, are operated to deliver oil under low pressure to the bearing shoes, the pressure in the delivery circuit being held at a fixed value by pressure relief circuit 47 whose outflow is controlled by calibrated valve 45 and thermostatically controlled valve 42 whose closure is controlled by a thermostat responding to a set temperature value for the oil. This arrangement permits the progressive delivery of oil to all the lubricating conduits and avoids a sudden rise in the oil pressure at the start of the pumps when the circuits are blocked by gelled oil.

Pressure gauges 30 in the high pressure oil circuits 28 control the start of the crusher drum rotation, for which purpose the gauges are connected by electrical control circuit 19 to operating means 56 for driving crusher drum 11, this operating means including a motor for rotating the drum and a control for actuating the motor in response to the sensed pressure, the motor being stopped when the oil pressure in high pressure circuits 28 falls below a set pressure value. At the end of a relatively short, set time after the drum rotation has been started, high pressure pump 24 is stopped and the lubrication is then continued solely by operation of low pressure pumps 14 and 36. Flowmeters 20 and 37 are placed in the low pressure oil delivery circuits which supply lubricating oil to the bearings and these flowmeters also control the drum rotation, for which purpose they are connected respectively by electrical control circuits 29 and 21 to operating means 56 for driving drum 11. As soon as the oil flow falls below a set value, the flowmeters will cause the drum to stop rotating and, simultaneously, high pressure pump 24 will be operated to assure lubrication until the drum has stopped rotating. Since high pressure pump 24 is in connection with two low pressure circuits, malfunctioning of one of these circuits will not impede oil delivery to this pump.

If, during the rotation of drum 11, the temperature of the gliding surface of bearing shoes 10, as measured by thermocouples 54, reaches a first set value T1 corresponding to an undesirable excess temperature of the surface, pump control 58 actuates high pressure pump 24 to assure supplemental delivery of lubricating oil to the bearing shoes and, at the same time, an alarm signal is produced to enable an operator to search for the cause of the overheating and to correct it without stopping rotation of the drum, if possible. However, if the overheating of the bearing shoes continues and reaches a second set value T2 higher than the first value T1, electrical control circuit 39 connected operating means 58 and 56 will send a control signal to operating means 56 to stop rotation of the drum while the high pressure pump remains in operation until the rotation has completely ceased.

During normal operation, the cooling of the bearings and the gliding surface of the rotating element are assured by the lubricating oil delivered by the low pressure circuits, the temperatures of the delivered lubricating oil being held within predetermined limits by operation of thermostatically controlled heating plates 40 and heat exchangers 18. The bearing shoes may have channels through which the lubricating oil circulates and the gliding rings of the rotating drums are cooled by spraying lubricating oil thereover.

In the illustrated embodiment, each bearing receives lubricating oil from a low pressure pump associated therewith while a single high pressure pump feeds both bearing shoes, the input of the high pressure pump being connected to the output or delivery circuit of the low pressure pumps by conduit branches 23 and 25 in which check valves 26 assure unidirectional oil flow.

As soon as the temperature of the lubricating oil surpasses a set value T3, for example 50° C., thermostatically controlled valve 52 is opened to permit flow of cooling fluid, i.e. water, to the heat exchangers 18, thus cooling the oil to the set temperature value. If, despite cooling, the oil remains at an excessive temperature, for example 60° C., thermostat 48 which senses the temperature of the oil in tank 38 produces an alarm signal.

When the drum is stopped for a relatively short period of time, the temperature of the oil in tank 38 is maintained at a set value T4, for example 40° C., by means of heating plates 40 whose heating is controlled by thermostat 50. To avoid possible calcination of the oil in the tank, the thermostat 50, which responds to the temperature of the tank will just above the heating plates, stops heating of the plates when the temperature becomes excessive, i.e. above 110° C.

The termostatically controlled system for maintaining the oil temperature in tank 38 within a given range is put out of service only when the crusher operation is discontinued over an extended period of time. When, at the time of starting up again, the temperature of the oil in the tank is below value T4, thermostat 46 will prevent operation of pump 14 connected to valve 42 and prevents the operation of the other pump 14, as well as pumps 24 and 36. However, when the oil temperature falls below a set value T5 lower than T4, thermostat 44 connected to valve 42 by electrical control circuit opens valve 42 and pump 14 connected to this valve establishes oil circulation through calibrated valve 45 and to the low pressure oil circuits of bearing shoes 10 to assure gradual reheating of the circuits elements and of the bearing shoes. When the oil temperature reaches value T5, valve 42 is closed and then it reaches value T4, pumps 14, 24 and 36 are operated and the drum rotation may be started.

What is claimed is:

1. A lubricating system for bearing shoes having gliding surfaces supporting a heavy element of large diameter for rotation about an axis thereof in one direction, the bearing shoes having an upstream end and a downstream end, in said direction, and defining a lubricating oil basin therebetween, which comprises
   (a) a low pressure lubricating oil pump operable to deliver lubricating oil to the upstream end of the bearing shoes during the rotation of the heavy element,
   (b) a high pressure lubricating oil pump operable to deliver lubricating oil to the basin at the start of the rotation,
   (c) means for operating the high pressure pump, and
   (d) thermocouple means arranged to measure the temperature of the bearing shoes close to their gliding surfaces, the thermocouple means controlling the operating means for actuating the high pressure pump in response to a temperature sensed by the thermocouple means exceeding a first set value.

2. The lubricating system of claim 1, further comprising means for actuating the rotation of the heavy element, the thermocouple means controlling the actuating means for stopping the rotation in response to a temperature sensed by the thermocouple means exceeding a second set value higher than the first set temperature value, the operating means actuating the high pressure pump until rotation of the heavy element has completely ceased.

3. The lubricating system of claim 1, wherein the thermocouple means are arranged close to the downstream ends of the bearing shoes.

4. The lubricating system of claim 1, further comprising conduit means connecting an output of the low pressure pump to the bearing shoes, and an oil cooling means in the conduit means for cooling the oil.

5. The lubricating system of claim 1, comprising two of said low pressure pumps each operable to deliver the lubricating oil to a respective one of the upstream ends of two of said bearing shoes supporting the heavy element for rotation, and the high pressure pump has an input connected to the output of the two low pressure pumps.

6. The lubricating system of claim 1, further comprising temperature control means for maintaining the lubricating oil delivered to the bearing shoes within predetermined temperature limits.

7. The lubricating system of claim 6, wherein the temperature control means comprises a water-cooled heat exchanger for cooling the oil delivered by the low pressure pump, conduit means for circulating water through the heat exchanger, and a thermostat-controlled valve in the conduit means for controlling the circulation of the water in response to a set temperature.

8. The lubricating system of claim 6, wherein the temperature control means comprises an oil tank holding a supply of oil and thermostat-controlled heating means for heating the oil in the tank, two of said low pressure pumps being operable to deliver the lubricating oil to a respective one of the bearing shoes, and conduits connecting the inputs of the low pressure pumps to the oil tank whereby the pumps draw oil from the tank.

9. The lubricating system of claim 8, wherein the tank has walls, the heating means comprises heating plates mounted on at least one of the tank walls, and the thermostat is arranged to measure the temperature close to the plates and to stop heating when the temperature exceeds a value exceeding that leading to calcination of the oil.

10. The lubricating system of claim 8, further comprising a branch conduit connected to the output of one of the low pressure pumps, a valve and a calibrated valve in the branch conduit, a termostat means responsive to a set temperature value indicating a temperature too low for proper operation of the lubricating system, and an electrical control circuit connecting the thermostat means to the valve for opening the valve in response to the set temperature value whereby the valve will permit the one low pressure pump to deliver oil to the bearing shoes and to assure reheating thereof by means of the oil heated in the tank.

* * * * *